(No Model.)
J. C. SCHUMAN.
METHOD OF PREPARING STARCH FROM GRAIN.
No. 345,926. Patented July 20, 1886.
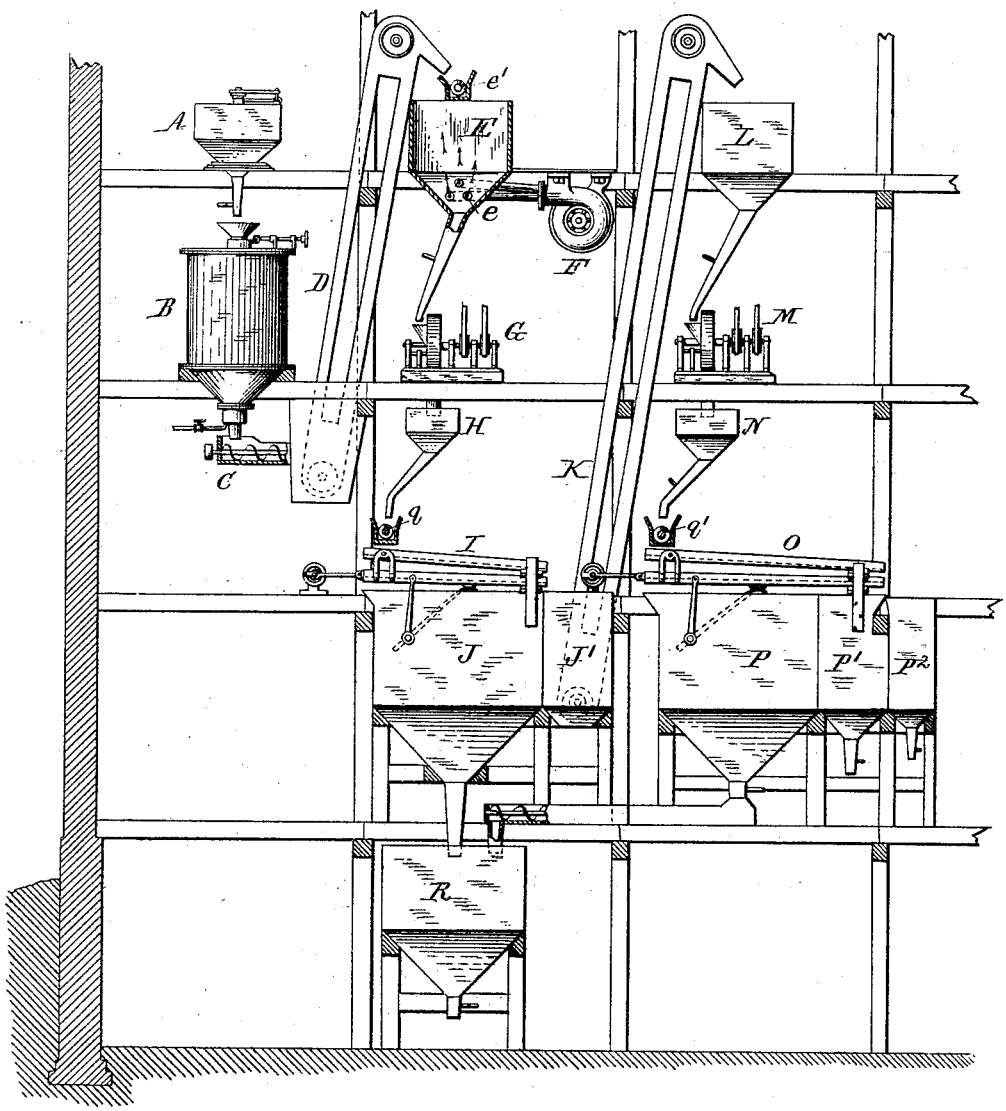
Witnesses:
Chas. J. Buchbeit.
Theodore L. Popp.
J. C. Schuman, Inventor.
By Wilhelm & Bonner.
Attorneys

UNITED STATES PATENT OFFICE.

JOHN C. SCHUMAN, OF AKRON, ASSIGNOR TO WILLIAM T. JEBB, OF BUFFALO, NEW YORK.

METHOD OF PREPARING STARCH FROM GRAIN.

SPECIFICATION forming part of Letters Patent No. 345,926, dated July 20, 1886.

Application filed April 19, 1886. Serial No. 199,397. (No model.)

*To all whom it may concern:*

Be it known that I, JOHN C. SCHUMAN, of Akron, in the county of Erie and State of New York, have invented new and useful Improvements in the Method of Preparing Starch from Grain, of which the following a specification.

This invention relates to that method of extracting starch from grain, especially Indian corn or maize, which consists in first softening the corn by steeping and then separating the bran or offal from the crude starch in a comparatively dry condition. This method of extracting starch from grain is described in several patents of the United States granted to me. (See, for instance, Letters Patent No. 316,405, dated April 21, 1885.)

Heretofore the operation of steeping has been carried on to such an extent that the bodies of the kernels were completely softened, so that in the subsequent reducing operation the hulls and germs were stripped from the bodies, which latter were reduced to a coarse meal forming the crude starch, which was then in a condition to be further treated as required for producing the desired ultimate product.

The object of this invention is to produce from the grain, in addition to the crude starch, a food product, which consists of the reduced hard or horny portions of the bodies which lie between the inner starchy portions and the hulls.

My invention consists, to that end, of the improvements which will be hereinafter fully set forth, and pointed out in the claims.

The accompanying drawing represents a plant of machinery whereby my invention can be practiced.

A represents the weigh hopper or charger which receives the Indian corn or maize, and from which the same passes to the steep-tank B. In the latter the corn is steeped sufficiently to permit of the separation of the hulls, the horny portions, and the starchy portions from each other by the subsequent treatment.

The operation of steeping is preferably conducted by supplying the steep-tank with water having a temperature of about 140° Fahrenheit, and renewing the water from time to time, as may be necessary to maintain this temperature approximately. The corn is steeped in this manner for a period of about eight hours. While I prefer to conduct the steeping operation in this manner, it may be modified, as the condition of the corn and other circumstances may render expedient. The corn is sufficiently steeped when the kernels have become softened to such an extent that the inner starchy portions will separate easily from the surrounding layer of hard, horny, or glutinous material, and the latter from the inclosing-hull. In this condition of the kernels the germs will also separate easily from the hulls and horny portions.

C represents a conveyer which receives the steeped corn from the steep-tank B, and D represents an elevator whereby the steeped corn is elevated from the conveyer C to a receiving bin or hopper, E. The latter is provided with perforated pipes *e*, which are supplied with air by a fan, F, or other suitable air-propelling device, and which direct air-currents through the corn in the bin E, thereby drying and cooling the same. In passing through the conveyer and elevator the steeped corn is loosened, so that the air-currents issuing from the perforated pipes *e* will come in contact with all parts of the corn and thoroughly remove the heat and moisture therefrom. The steeped corn is subjected to the action of the air-currents in the bin E, preferably, for about two hours. This causes the hulls and germs to become tough, and hardens the horny parts of the kernels. When two or more bins, E, are arranged side by side, the corn coming from the elevator is distributed to the several bins by a conveyer, *e'*.

G represents a reducing-machine, which receives the corn from the bin E, and in which the corn is reduced in such manner that the hulls are stripped in large flakes from the horny portions of the kernels and the latter are reduced to coarse fragments, while the inner starchy portions of the kernels, which are softer, are reduced to meal. I prefer for this purpose a machine which consists of several concentric rows of beaters revolving at a high speed in opposite directions within an inclosing-case, and whereby the grain is whipped or beaten. While I prefer to employ a whipping or beating machine for this reduction, any other suitable reducing-machine may be employed for this purpose. For instance, a disk-mill in which one of the disks has an eccentric movement with reference to the other, or a roller-mill; but none of these effect the desired reduction so completely and advantageously as the beating or whipping machine first mentioned.

H represents a hopper which receives the reduced material from the reducing-machine G.

I represents a screen-separator, whereby the starch-meal is separated from the coarser portions of the reduced material, the starch-meal passing to a receiver, J, while the coarser particles tail off and are collected in a receiver, J'.

K represents an elevator, which elevates the material from the receiver J' to a bin or hopper, L.

M represents a secondary reducing-machine which receives the material from the bin L, and in which the material is subjected to a second reducing operation, whereby the fragments of hulls and horny material are freed from any starch particles which may still adhere to the same.

The secondary reducing-machine is preferably of the same construction as the first reducing-machine, G.

N represents a hopper which receives the material from the secondary reducing-machine M.

O represents a screen separator which receives the material from the hopper N, and which separates the starch-meal from the fragments of the horny portions and the latter from the hulls. The starch-meal passes into a receiver, P, the fragments of the horny portions into a receiver, P', and the hulls into a receiver, P². The separator which I prefer to employ for this purpose and the preceding separation consists of an upper coarse screen and a lower fine screen, as described and shown in Letters Patent of the United States No. 334,090, granted to me January 12, 1886. When two or more screen-separators are arranged side by side, the material is distributed to the separators by conveyers $q$ $q'$, arranged above the same.

R represents a final hopper or bin, which receives the starch-meal from the receivers J and P.

The starch-meal so extracted from the corn can now be further treated as may be necessary in order to produce the desired ultimate product. For instance, it may be worked up into laundry or culinary starch, grape-sugar, or glucose, or it may be used for the manufacture of distilled spirits, or as a substitute for malt in the manufacture of beer and ale, &c. The fragments of the hard or horny portions of the kernels contain the bulk of the glutinous material contained in the grain, which is most valuable for food purposes and not desirable for the manufacture of starch and starch products. This hard glutinous material is obtained in the form of coarse grits, and may be dried and sold for food purposes in this condition, or it may be ground one or more times, purified, and bolted for the purpose of producing a nutritious flour. The hulls are practically free from starch, and may be used as cattle-feed either in the damp condition in which they are obtained or after being dried and reground. The drying of the corn after leaving the steep and before reduction not only facilitates the reduction of the grain, but also expedites the operation of sifting, prevents clogging up of the screens, permits the use of finer cloth thereon, and produces a drier condition of the separated products.

I claim as my invention—

1. The herein-described method of extracting starch from grain, which consists in steeping the grain sufficiently to soften the inner starchy portions of the kernels without softening the surrounding hard glutinous or horny portions, then reducing the grain, whereby the hulls are stripped from the horny parts, which are reduced to coarse fragments, while the starchy portions are reduced to meal, and then separating the hulls, the fragments of the hard or horny material, and the starch-meal by sifting, substantially as set forth.

2. The herein-described method of extracting starch from grain, which consists in steeping the grain sufficiently to soften the inner starchy portions of the kernels without softening the surrounding hard glutinous or horny portions, then reducing the grain by whipping or beating, whereby the hulls are stripped from the horny parts which are reduced to coarse fragments, while the starchy portions are reduced to meal, and then separating the hulls, the fragments of hard or horny material, and the starch-meal by sifting, substantially as set forth.

3. The herein-described method of extracting starch from grain, which consists in steeping the grain sufficiently to soften the inner starchy portions of the kernels without softening the surrounding hard glutinous or horny portions, then reducing the grain, then separating the starch-meal from the coarser particles of the reduced material, then subjecting such coarser particles to a second reduction, and then separating the hulls, the fragments of hard or horny material, and the starch-meal, substantially as set forth.

4. The herein-described method of extracting starch from grain, which consists in steeping the grain, then removing the grain from the steep and drying it by an air current in a separate vessel or receiver, then reducing the grain, and then separating the starch-meal from the coarser particles, substantially as set forth.

5. The herein-described method of extracting starch from grain, which consists in steeping the grain sufficiently to soften the inner starchy portions of the kernels without softening the surrounding hard glutinous or horny portions, then drying the steeped grain, then reducing the grain, whereby the hulls are stripped from the horny parts, which are reduced to coarse fragments, while the starchy portions are reduced to meal, and then separating the hulls, the fragments of the hard or horny material, and the starch-meal by sifting, substantially as set forth.

Witness my hand this 14th day of April, 1886.

J. C. SCHUMAN.

Witnesses:
 WM. H. CARR,
 AUSTIN TYLER.